United States Patent [19]

Hurst, Jr.

[11] Patent Number: 4,506,293

[45] Date of Patent: Mar. 19, 1985

[54] INDEPENDENT FLESHTONE CONTOURS

[75] Inventor: Robert N. Hurst, Jr., Cherry Hill, N.J.

[73] Assignee: RCA Corporation, New York, N.Y.

[21] Appl. No.: 625,194

[22] Filed: Jun. 28, 1984

Related U.S. Application Data

[63] Continuation of Ser. No. 284,105, Jul. 16, 1981, abandoned.

[51] Int. Cl.³ .............................................. H04N 9/535
[52] U.S. Cl. ...................................... 358/37; 358/27; 358/28
[58] Field of Search ...................... 358/22, 27, 28, 37, 358/96, 21 V

[56] References Cited

U.S. PATENT DOCUMENTS

| Re. 29,570 | 3/1978 | Breimer | 357/37 |
| 3,729,580 | 4/1973 | Schneider | 358/37 |
| 3,938,181 | 2/1976 | Avins | 358/37 |
| 4,167,021 | 9/1979 | Holmes | 358/38 |
| 4,227,205 | 10/1980 | Gomi | 358/27 |
| 4,306,247 | 12/1981 | Tomimoto | 358/28 |
| 4,316,215 | 2/1982 | Yasumoto | 358/37 |
| 4,327,374 | 4/1982 | Matsuda | 358/28 |

FOREIGN PATENT DOCUMENTS 140825 1/1979 Japan ...................................... 358/37

Primary Examiner—Tommy P. Chin
Attorney, Agent, or Firm—William H. Meise; Paul J. Rasmussen; Eugene M. Whitacre

[57] ABSTRACT

A circuit providing independent control of selected color areas, such as fleshtone areas, is shown. The circuit comprises a fleshtone detector and a fleshtone contour control circuit. The fleshtone detector comprises a negative absolute value circuit using PNP transistors. A delay line circuit can be used to expand the fleshtone contour level to areas beyond the fleshtone areas. A fleshtone detector can also be used to control other special effects, such as luminance.

14 Claims, 10 Drawing Figures

INDEPENDENT FLESHTONE CONTOURS

This is a continuation of application Ser. No. 284,105, filed July 16, 1981, now abandoned.

BACKGROUND OF THE INVENTION

The present invention relates to color video signal contour correction, and more particularly to such correction that is less for some colored areas, e.g., fleshtones, of the scene than for the remaining areas.

"Contours" is a term used in broadcast television camera system art to denote the signal that represents the changes between adjacent picture elements, both horizontally and vertically. The vertical contour signal is typically generated by averaging signals from points above and below the point in question and then subtracting the resulting average from the signal representing the point in question. Similarly, the horizontal contour signal is generated by averaging signals representing points to the left and right of the point in question and then subtracting the resulting average from the signal representing the point in question. It might be thought that a picture that is as sharp as possible would be desirable and thus a large amount of both horizontal and vertical contour should be added to the luminance signal representing the point in question. A circuit capable of doing this is shown in FIG. 1 where the amplitude of the combined horizontal and vertical contour signal received at terminal 11 is controlled by potentiometer 10 and the adding to the luminance signal received at terminal 13 is done by adder 12. However, a high amplitude contour signal is not necessarily desirable. Consider a "head-and-shoulders" shot of an aesthetically pleasing female. If the contour signal amplitude is large, every wrinkle and pore on the face will be so accentuated as to reduce her aesthetic qualities. Similarly, for a male face, unshaven facial hairs will be accentuated. Of course, hair on the head and the background, look pleasingly sharp. In this situation, the camera operator reduces the contour signal amplitude in order to make a trade-off between "sharp hair" and "unaesthetic face".

It is therefore desirable to have a contour correction system where the amount of contour correction varies with the color represented by said video signal.

SUMMARY OF THE INVENTION

Method and apparatus for processing a color video signal, comprising generating a contour signal, and combining a selected amount of said contour signal with said video signal in accordance with the color represented by said video signal.

DETAILED DESCRIPTION

Figure 1:
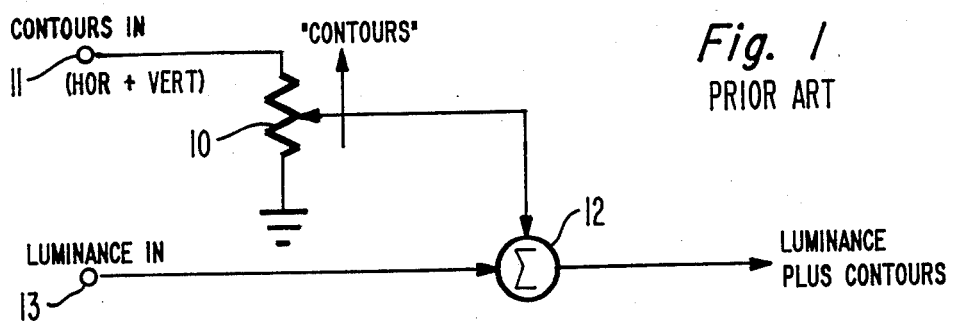
FIG. 1 is a drawing of a typical prior art contour-adding circuit.
Figure 2:
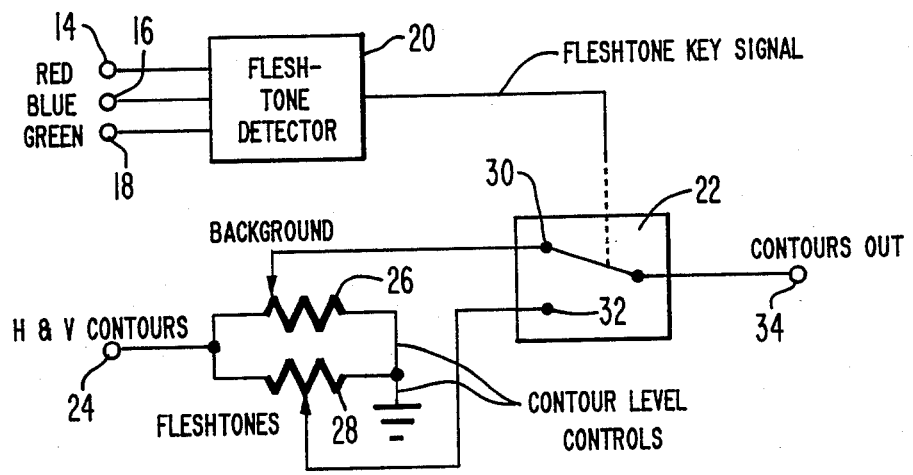
FIG. 2 is a block diagram of a first embodiment of the invention.

FIG. 2 shows a prototype circuit in accordance with the invention. Red (R), blue (B), and green (G)-representative signals from the imagers (not shown) after suitable amplification are received at input terminals 14, 16 and 18 respectively and applied to a fleshtone detector 20 (described below in conjunction with FIG. 4). Detector 20 provides a fleshtone key output signal (which is a signal that is present whenever the signals at terminals 14, 16 and 18 represent human flesh as determined by a particular ratio of red to blue to green) to switch 22 as a control signal. It will be appreciated that while switch 22 is illustrated as a mechanical switch, an electronic switch is actually used. Input terminal 24 receives a conventional horizontal and vertical contour signal that can be generated in known fashion using delay lines (not shown). The contour signal is applied to potentiometers 26 and 28, which potentiometers control the amplitude thereof. The sliders of potentiometers 26 and 28 are respectively coupled to contacts 30 and 32 of switch 22. Output terminal 34 provides the contour signal, as modified in accordance with the principles of the present invention, for application to terminal 11 shown in FIG. 1, so that the contour signal is added to the luminance signal. Alternatively the contour signal can be added to component signals such as R, G and B, or I (inphase) and Q (quadrature).

In operation, when no fleshtones are being provided by the imagers, no key signal is provided by detector 20. Switch 22 is in the position shown in FIG. 2, and therefore potentiometer 26 controls the amplitude of the contour signal, as in the prior art of FIG. 1. When a fleshtone is being provided, a key signal is supplied by detector 20 and therefore output 34 is connected to contact 32. Now potentiometer 28 controls the contour signal amplitude. When fleshtone is no longer detected, the switch 22 reverts to its upper position. Thus the contour signal amplitude can be independently controlled for fleshtones and non-fleshtones.

A possible problem with the switching embodiment of FIG. 2 is that any indecision on the part of detector 20 may result in sparkling edges around faces. An analog embodiment which avoids these problems will be described below in conjunction with FIGS. 4 and 5. However, for a full understanding of this embodiment it is desirable to first consider FIG. 3.

Figure 3:
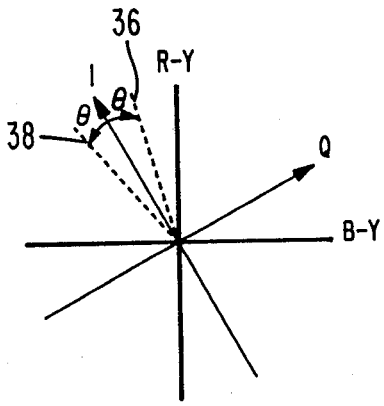
FIG. 3 is a graph on the color difference plane for a video signal.

FIG. 3 is a graph of the B−Y signal on the horizontal axis and the R−Y signal on the vertical axis, Y being the luminance signal. Also shown are the I and Q signal axes. Fleshtones fall near the +I axis for both caucasian and negro subjects, although at different luminance signal values, and therefore what is needed is a circuit that detects when a color signal is within $\pm\theta$ of the +I axis as indicated by dotted lines 36 and 38. The equation for line 36 is I=KQ, while the equation for line 38 is I=−KQ. The derivation of these equations can be more easily understood by clockwise rotating the I and Q axes to be vertical and horizontal respectively. It is noted that $\theta = \arctan(1/K)$. The area above line 36 is given by I>KQ, while the area above line 38 is given by I>−KQ. The area between lines 36 and 38 indicated by the angles $\theta$ is therefore given by $I-K|Q|>0$, hence when a signal representing $I-K|Q|$ is positive, the color difference is within the lines 36 and 38, i.e., the signal represents a fleshtone.

Figure 4:
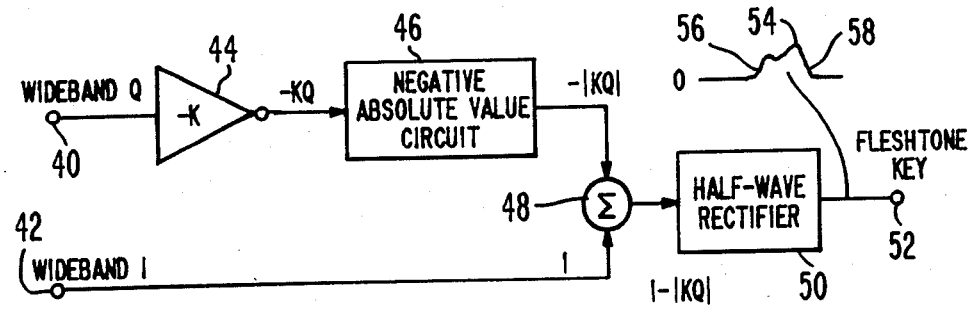
FIG. 4 is a block diagram of a fleshtone key generator in accordance with the invention.

FIG. 4 shows a fleshtone detector circuit for implementing the above equation. Wideband Q and I signals, which signals can be derived by matrixing the R, G, and B signals, are received at inputs 40 and 42, respectively. The Q signal is applied to inverting amplifier 44 which provides at its output a signal $-KQ$. It is then required that the negative of the absolute value of the latter signal be generated. This can be done by first taking the absolute value and then inverting the absolute value. However, in the present invention, a negative absolute value circuit 46 (described below) is used to directly generate the signal $-|KQ|$, which signal is applied to one input of adder 48. The I signal at terminal 42 is applied to the remaining input of adder 48. Thus, the output signal from adder 48 is $I-|KQ|$, which output signal is applied to half wave rectifier 50. Rectifier 50 only allows positive portions of the output signal from adder 48 to be applied to output terminal 52 as a fleshtone key signal, since only such portions indicate fleshtones.

A typical key signal is shown as waveform 54. It is noted that it has a gradully rising leading edge 56 and a gradually falling trailing edge 58 to avoid sparkling around the edges of a face (when used with the embodiment of FIG. 5), which sparkling can arise with the embodiment of FIG. 2. If desired, a peak amplitude clipper can be used so that the amplitude of the signal 54 between edges 56 and 58 is a constant. This results in a constant amount of contour correction for the fleshtone portions of the displayed image. Of course, the clipping level cannot be set too low or edges 56 and 58 will become too steep giving rise to said sparkling edges.

Figure 5:
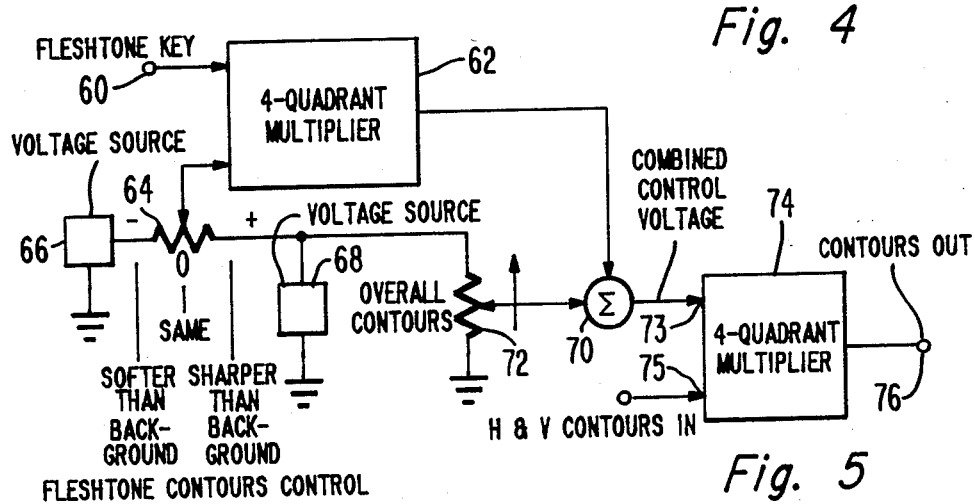
FIG. 5 is a block diagram of a preferred embodiment of the invention.

The fleshtone key signal at output 52 could be inverted, amplitude controlled, and then added to a contour level control signal, inversion being needed to reduce the contours during fleshtone occurrences rather than increasing them. However, FIG. 5 shows a better circuit for achieving this which uses a four-quadrant multiplier 62. The fleshtone key signal from output 52 is received at input 60 and applied to one input of multiplier 62. A fleshtone contour control potentiometer 64 has the negative output of voltage source 66 coupled to one end and the positive output of voltage source 68 coupled to the other end. The slider arm of potentiometer 64 is coupled to the remaining input of multiplier 62. Thus the fleshtone key signal at input 60 is multiplied by the fleshtone contour signal control voltage from the slider of potentiometer 62. It will be appreciated that potentiometer 64 and its associated voltage sources 66 and 68 can be placed in a position remote from the camera, which is a requirement of modern triaxial cable cameras. If sources 66 and 68 have equal but opposite potential, then the center position of potentiometer 64 comprises that position in which the fleshtone contour level is the same as the background contour level. To the left of center, as viewed in FIG. 5, corresponds to when fleshtone areas are softer or less enhanced than the non-fleshtone areas, while to the right of center corresponds to when the fleshtone areas are sharper than the non-fleshtone areas. The latter situation may be desirable when viewing a male subject to bring out facial features that emphasize "character" or "manliness".

It will be appreciated that other embodiments for achieving similar results are possible, e.g., fading with a potentiometer between non-inverted and inverted fleshtone key signals.

The output signal of multiplier 62 is applied to one input of adder 70. Potentiometer 72 receives a positive voltage from source 68 and applies a portion of this voltage as determined by the position of its slider to the other input of adder 70 as an overall contour control voltage, i.e., it controls contours in both fleshtone and non-fleshtone areas.

The combined contour control voltage (overall and fleshtone contour control voltage) is applied to one input 73 of four-quadrant multiplier 74, which typically is already present in the camera. The remaining input 75 of multiplier 74 receives the normal contour signal. The output signal of multiplier 74 at output 76 comprises the contour signal multiplied by the appropriate value of the control voltage. Output 76 is directly coupled to adder 12 of FIG. 1 (bypassing potentiometer 10), so that the contour signal is added to the luminance signal.

Figure 6:
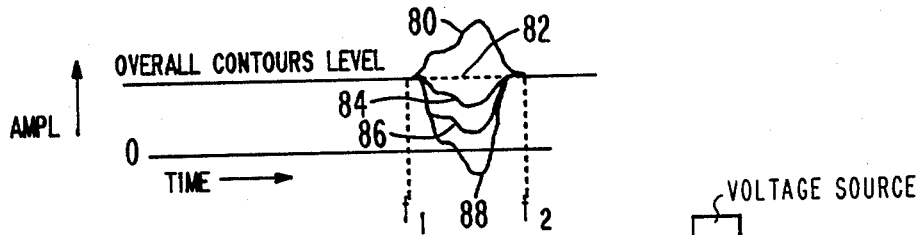
FIG. 6 is a time diagram of a contour control signal.

FIG. 6 shows the effect of varying the fleshtone contours control voltage from potentiometer 64 on the combined contour control voltage assuming that waveform 54 of FIG. 4 is present at input 60. In this figure, the horizontal axis represents time, while the vertical axis represents the amplitude of the combined control voltage signal from adder 70. Before time $t_1$, there is no fleshtone color signal present, and therefore, the control voltage is a constant which is determined by the setting of potentiometer 72. Between times $t_1$ and $t_2$, fleshtones are present, and the effect on the overall contour control signal is determined by the setting of potentiometer 64. When the slider of potentiometer 64 is to the right of center, waveform 80 is produced, which increases the contour level, and hence the sharpness of the fleshtone areas compared to the sharpness of the background. When the slider is centered, waveform 82 is produced, and therefore there is no change in the contour level. When the slider is slightly to the left of center position, the contour signal is reduced as shown by waveform 84, and hence the fleshtones are made softer than the background sharpness. Waveform 86 shows still softer contouring when the slider is set still further left. When the slider is set near its extreme leftmost position, the combined contour signal can go negative, as shown by waveform 88. This makes the fleshtone areas softer than with no added contour signal at all. After time $t_2$, the combined contour control signal is again a constant.

Figure 7:
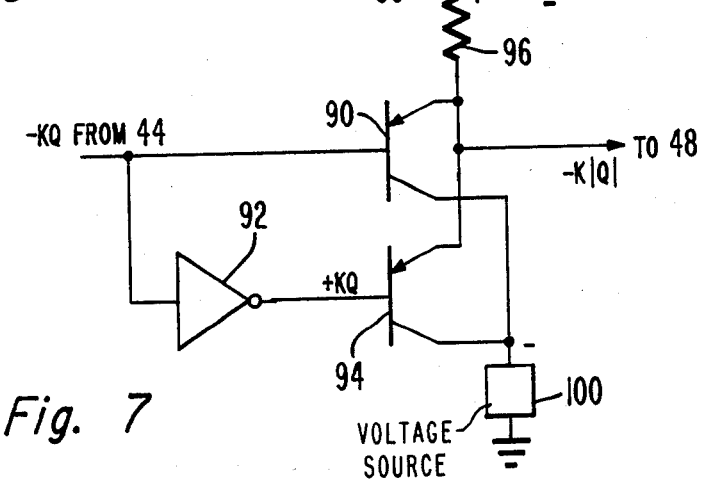
FIG. 7 is a schematic for a negative absolute value circuit.

FIG. 7 is a detailed schematic diagram of negative absolute value circuit 46 of FIG. 4. The $-KQ$ signal from inverter 44 of FIG. 4 is applied to the base of PNP transistor 90 and to inverter 92. Inverter 92 provides a $+KQ$ signal to the base of PNP transistor 94. The emitters of transistors 90 and 94 are connected through a load resistor 96 to the positive terminal of voltage source 98 and directly to adder 48 of FIG. 4. The collectors of transistors 90 and 94 are connected to the negative terminal of voltage source 100. Transistors 90 and 94 conduct when their bases are nominally negative with respect to their emitters. The conduction causes a voltage drop across resistor 96, thus making the output voltage drop and become more negative. Transistors 90 and 94 form a non-additive mixer, and thus the amount of the drop is determined by the current drawn by whichever transistor has the negative base voltage. Thus, the output signal is the absolute value of the input signal, since one transistor will always have a negative base voltage regardless of the input polarity due to inverter 92.

Figure 8:
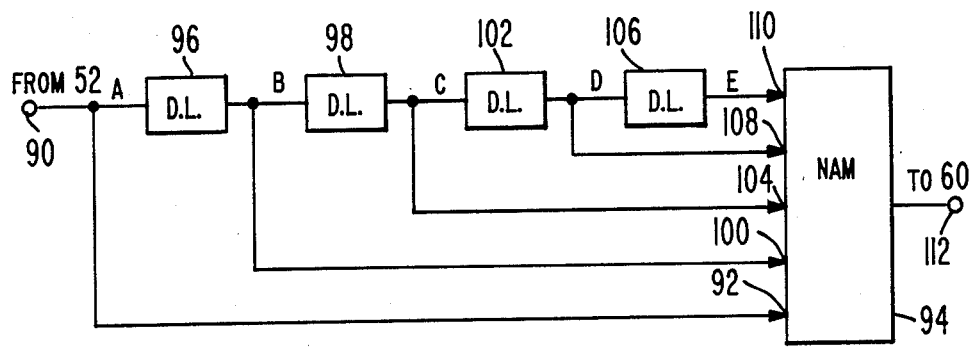
FIG. 8 is a key-signal-spreading circuit.

It may be desirable for artistic reasons to reduce the sharpness not only of a given fleshtone area, but to extend the sharpness reducing effect to include an area slightly larger than the fleshtone area. The circuit of FIG. 8 is coupled between the circuits of FIGS. 4 and 5 and achieves this result. The fleshtone key signal from output 52 of FIG. 4 is represented by point A in FIG. 9 and is applied to input 90 of FIG. 8. Input 90 applies the key signal to input 92 of NAM (non-additive mixer) 94 as well as to delay line 96, which has a delay of about 200ns (nanoseconds). The output signal from delay line 96 is shown as point B in FIG. 9 and is applied to delay line 98, which has a delay of 1H (63.55 microseconds for NTSC)—about 100ns and also to input 100 of NAM 94. The output signal from delay line 98 is shown as point C and is applied to delay line 102, which has a delay of 1H—about 100ns, and also to input 104. The output signal from delay line 102 is shown as point D and is applied to delay line 106, which has a delay of 200ns, and also to input 108. The output signal from delay line 106 is point E and is applied to input 110. NAM 94 (also called an analog OR gate) provides the most positive signal to output terminal 112, which in turn is coupled to input 60 of FIG. 5.

Figure 9:
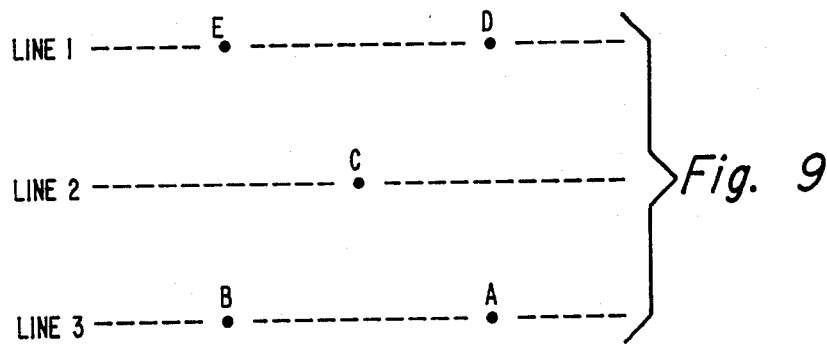
FIG. 9 shows a scanning raster useful in explaining FIG. 8.

When using the area expander of FIG. 8, the video which has the contour signal added to it must be delay equalized by 1H+100ns. Thus point C in FIG. 9 is the reference point for further discussion, since it is delayed this amount with respect to point A, the input signal for FIG. 8. It will be seen that if a fleshtone exists in the signal at point C, NAM 94 will provide a fleshtone key signal at times corresponding to all of points A, B, C, D, and E. Thus, the fleshtone contour signal reduction will take place not only in a fleshtone area, but also in an area expanded in the horizontal, vertical, and diagonal directions from the fleshtone area.

Figure 10:
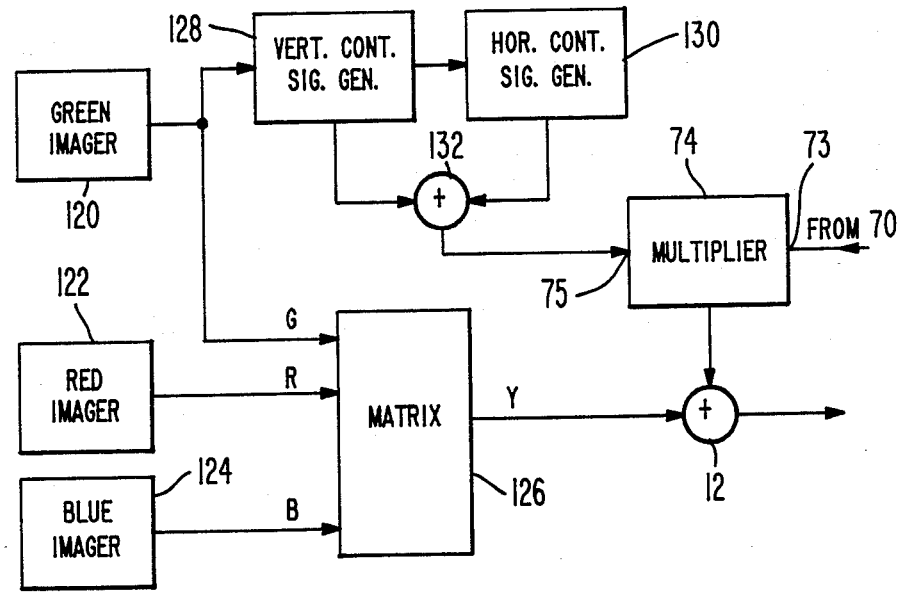
FIG. 10 shows a contour generating circuit using the principle of the invention.

FIG. 10 shows one possible use of the invention in a camera system. Green, red and blue imagers 120, 122 and 124 respectively receive green, red and blue light from a single scene and provide output signals corresponding thereto, which output signals are applied to a matrix 126. Matrix 126 provides a luminance (Y) output signal to one input of adder 12. To avoid registration problems, the contour signal is derived from only the green signal. The green signal is therefore also applied to vertical contour signal generator 128. As is known in the art, generator 128 comprises cascaded 1H delay lines, with their junction providing the reference signal point in question. The input signal of the first delay line and the output signal of the second delay line are averaged and then subtracted from the reference signal. The result is a vertical contour signal that is applied to adder 132. The reference signal from generator 128 is applied to horizontal contour signal generator 130, which is identical to generator 128 except that the delay lines have a delay of 100ns. The resulting horizontal contour signal is applied to adder 132. The output signal is a composite (horizontal and vertical) contour signal that is applied to input 75 of multiplier 74. The other input 73 of multiplier 74 receives the combined contour control voltage from adder 70 of FIG. 5. The thus multiplied contour signal is then applied to adder 12 to sharpen the image produced by the Y signal provided by adder 12. Where needed, equalizing delay lines can be provided.

It will be appreciated that many other embodiments are possible within the spirit and scope of the invention. For example contour signal reduction or increase can take place in selected color areas other than fleshtone areas. Further, a fleshtone detector such as shown in FIG. 4 can be used to provide other special effects, such as increasing the luminance in fleshtone areas to highlight a face.

What is claimed is:

1. An apparatus for processing a color video signal, said apparatus comprising:
   generating means for generating a contour signal from said video signal,
   detecting means for detecting the hue represented by said video signal; and
   combining means comprising a fleshtone detector and a contour control circuit coupled to said detecting means and generating means for combining a selected amount of said contour signal with said video signal in accordance with a control signal represented by the hue of said video signal, said fleshtone detector comprising an amplifier coupled to receive a Q signal from said detecting means, a negative absolute-value circuit coupled to said amplifier, an adder having a first input coupled to said negative absolute-value circuit and a second input for receiving an I signal from said detecting means, and a rectifier coupled to said adder to provide a fleshtone key signal.

2. Apparatus, comprising:
   a source of television video signal, said video signal representing the luminance, saturation and hue of a scene being televised;
   contour signal generating means coupled to said source of video signal for generating contour signals therefrom;
   control signal generating means coupled to said source of video signal for generating a control signal instantaneously indicative of the presence of a predetermined hue represented by said video signal;
   amplitude control means coupled to said contour signal generating means, said amplitude control means including an amplitude-controlling input terminal by which the amplitude of said contour signal may be controlled within each horizontal line by a controlling signal supplied thereto for producing an amplitude-controlled contour signal;
   control signal coupling means coupled to said amplitude-controlling input terminal of said amplitude control means and to said control signal generating means for coupling said controlling signal to said amplitude-controlling input terminal in response to said control signal; and
   summing means coupled to said source of video signal and to said amplitude control means for summing said amplitude-controlled contour signal with at least a component of said video signal for providing hue-dependent 3. Apparatus according to claim 2, wherein:
   said control signal generating means comprises receiving means for receiving from said signal source first and second vector component signals representing vector components of a color-representative signal; and
   phase-angle determining means coupled to said receiving means for determining the phase angle of said color-representative signal by determining the angle formed by the resultant of said two vectors for generating said control signal.

4. Apparatus according to claim 2, wherein said control signal generating means comprises:

processing means coupled to said source of video signal for processing a wideband Q signal component of said video signal to produce a processed wideband Q signal component of said video signal; and adding means coupled to said source of video signal and to said processing means for adding together a wideband I signal component of said video signal and said processed wideband Q signal component of said video signal.

5. Apparatus according to claim 4, wherein said processing means comprises:

first inverting amplifier means coupled to receive said wideband Q signal component and to invert its polarity to form an inverted wideband Q signal component; and negative absolute-value processing means coupled to said first inverting amplifier means for receiving said inverted wideband Q signal component therefrom for generating a negative-going signal representative of the absolute-value of said inverted wideband Q signal component for application as said processed wideband Q signal component to said adding means.

6. Apparatus according to claim 5, wherein said negative absolute-value processing means further comprises:

non-additive mixing means including an output terminal and first and second input terminals, said first input terminal of said non-additive mixing means being coupled to receive said inverted wideband Q signal component from said first inverting amplifier, and said second input terminal of said non-additive mixing means being coupled to receive noninverted wideband Q signal component for coupling to said output terminal of said non-additive mixing means the more negative of said inverted and noninverted wideband Q signal components.

7. Apparatus according to claim 2 wherein said amplitude control means comprises:

dividing means coupled to said contour signal generating means for producing a plurality of contour signals having preselected relative amplitudes; and switch means coupled to said dividing means and controlled in response to application of said controlling signal to said switch means for selecting among said plurality of contour signals having preselected relative amplitudes.

8. Apparatus according to claim 2 wherein said amplitude control means comprises:

multiplier means having a first input terminal coupled to said contour signal generating means for receiving said contour signals therefrom, and also having an amplitude-controlling input terminal coupled to receive said controlling signal from said control signal coupling means for controlling the amplitude of said contour signal in response to said controlling signal.

9. Apparatus according to claim 2 wherein: said control signal coupling means comprises conductive means for coupling said control signal to said amplitude controlling input terminal without further processing, whereby said control signal and said controlling signal are identical.

10. Apparatus according to claim 9 wherein said amplitude controlling means comprises:

dividing means coupled to said contour signal generating means for producing a plurality of contour signals having preselected relative amplitudes; and switch means coupled to said dividing means and controlled in response to said control signal for selecting among said plurality of contour signals having preselected relative amplitudes.

11. Apparatus according to claim 2 wherein said control signal coupling means comprises:

multiplier means having a first input terminal coupled to said control signal generating means for receiving said control signal therefrom, and also including a second input terminal coupled to a source of first preselected voltage for multiplying the amplitude of said control signal by a multiplier established by said first preselected voltage for amplitude adjustment of said control signal to form said controlling signal for application to said amplitude-controlling input terminal of said amplitude control means.

12. Apparatus according to claim 11 further comprising:

a source of second predtermined voltage; and summing means coupled to said multiplier means and to said source of second predetermined voltage for summing said second predetermined voltage with said amplitude-adjusted control signal for application to said amplitude-controlling input terminal of said amplitude control means of the sum of said second predetermined voltage with said amplitude-adjusted ocntrol signal.

13. Apparatus according to claim 2 wherein said control signal coupling means comprises:

delay means coupled to said control signal generating means for generating delayed versions of said control signal; and non-additive mixing means coupled to said control signal generating means for receiving said control signal and coupled to said delay means for receiving said delayed versions of said control signal for generating said controlling signal for controlling said amplitude control means in response to those portions of the image representing said predetermined hue and also in response to those portions of the image immediately adjacent to said portions of the image representing said predetermined hue.

14. Apparatus according to claim 2 wherein said contour signal generating means comprises vertical contour signal generating means horizontal contour signal generating means and second summing means for adding together said vertical and horizontal contour signals.

* * * * *

UNITED STATES PATENT AND TRADEMARK OFFICE
CERTIFICATE OF CORRECTION

PATENT NO. : 4,506,293

DATED : March 19, 1985

INVENTOR(S) : Robert Norman Hurst, Jr.

It is certified that error appears in the above-identified patent and that said Letters Patent is hereby corrected as shown below:

Column 1, line 15, "horizontally" should be --horizontally--.

Column 6, line 43, Claim 2, "supplied" should be --applied--.

Column 6, line 55, Claim 2, after "hue-dependent" insert --control of the contours within each horizontal line.--.

Column 8, line 38, Claim 12, "ocntrol" should be --control--.

Signed and Sealed this

Twenty-seventh Day of August 1985

[SEAL]

Attest:

DONALD J. QUIGG

Attesting Officer

Acting Commissioner of Patents and Trademarks